United States Patent
Xu et al.

(10) Patent No.: US 12,096,486 B2
(45) Date of Patent: Sep. 17, 2024

(54) USER EQUIPMENT DIRECT TRANSMISSION WHILE INACTIVE

(71) Applicant: Apple Inc., Cupertino, CA (US)

(72) Inventors: Fangli Xu, Beijing (CN); Chunhai Yao, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Sarma V. Vangala, Campbell, NJ (US); Srinivasan Nimmala, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,326

(22) PCT Filed: Aug. 6, 2020

(86) PCT No.: PCT/CN2020/107404
§ 371 (c)(1),
(2) Date: Sep. 21, 2021

(87) PCT Pub. No.: WO2022/027434
PCT Pub. Date: Feb. 10, 2022

(65) Prior Publication Data
US 2023/0156815 A1     May 18, 2023

(51) Int. Cl.
*H04W 74/0833* (2024.01)
*H04W 74/04* (2009.01)
*H04W 76/20* (2018.01)

(52) U.S. Cl.
CPC ....... *H04W 74/0841* (2013.01); *H04W 74/04* (2013.01); *H04W 76/20* (2018.02)

(58) Field of Classification Search
None
See application file for complete search history.

(56) References Cited

U.S. PATENT DOCUMENTS

| 10,728,927 B2 | 7/2020 | Chou et al. |
| 11,452,141 B2 | 9/2022 | Lei et al. |
| 11,672,017 B2 | 6/2023 | Agiwal et al. |

(Continued)

FOREIGN PATENT DOCUMENTS

| CN | 110536425 A | 12/2019 |
| CN | 110856276 A | 2/2020 |

(Continued)

OTHER PUBLICATIONS

PCT Search Report and Written Opinion dated Apr. 14, 2021 in connection with PCT Application No. PCT/CN2020/107404.

(Continued)

*Primary Examiner* — Adnan Baig
(74) *Attorney, Agent, or Firm* — Eschweiler & Potashnik, LLC

(57) ABSTRACT

Systems, methods, and circuitries are provided for direct transmission of uplink data by an INACTIVE UE using a contention free random access (CFRA) process. In one example, a method, includes, receiving, from a network, configuration of a dedicated physical random access channel (PRACH) resource or a dedicated preamble resource (dedicated PRACH/preamble resource); and while in a radio resource control (RRC) INACTIVE state, without entering an RRC CONNECTED state, using a contention-free random access (CFRA) process to transmit uplink data to a base station using the dedicated PRACH/preamble resource.

20 Claims, 9 Drawing Sheets

(56) References Cited

U.S. PATENT DOCUMENTS

| | | | |
|---|---|---|---|
| 2009/0109937 A1* | 4/2009 | Cave | H04W 74/004 370/336 |
| 2013/0301591 A1* | 11/2013 | Meyer | H04W 72/23 370/329 |
| 2014/0155109 A1* | 6/2014 | Vaidya | H04W 68/04 455/458 |
| 2018/0098356 A1* | 4/2018 | Li | H04W 72/20 |
| 2018/0279376 A1 | 9/2018 | Dinan et al. | |
| 2019/0253531 A1 | 8/2019 | Basu et al. | |
| 2020/0015285 A1 | 1/2020 | Shin et al. | |
| 2020/0037210 A1 | 1/2020 | Rugeland et al. | |
| 2020/0053790 A1* | 2/2020 | Shin | H04W 74/006 |
| 2020/0100299 A1 | 3/2020 | Loehr et al. | |
| 2020/0100318 A1 | 3/2020 | Sengupta et al. | |
| 2020/0107372 A1 | 4/2020 | Agiwal et al. | |
| 2021/0227587 A1 | 7/2021 | Tsai et al. | |
| 2021/0345395 A1* | 11/2021 | Chatterjee | H04W 56/0045 |
| 2022/0141883 A1 | 5/2022 | Lee et al. | |
| 2022/0201636 A1 | 6/2022 | Liu et al. | |
| 2022/0232623 A1* | 7/2022 | Lee | H04W 74/085 |
| 2022/0256618 A1* | 8/2022 | Liu | H04W 76/30 |
| 2023/0171839 A1 | 6/2023 | Alwar et al. | |

FOREIGN PATENT DOCUMENTS

| | | |
|---|---|---|
| CN | 110870378 A | 3/2020 |
| CN | 111314980 A | 6/2020 |
| EP | 3249996 A1 | 11/2017 |
| WO | 2019194649 A1 | 10/2019 |

OTHER PUBLICATIONS

Ericsson; "MT early data after preamble"; 3GPP TSG-RAN WG2 #106; R2-1906930; May 17, 2019.

International Search Report Dated Apr. 27, 2021 for International Application PCT/CN2020/107323.

International Written Opinion Dated Apr. 27, 2021 for International Application PCT/CN2020/107323.

Samsung; "Random Access Procedure for RRC Inactive State"; 3GPP TSG-RAN WG2; #99bis; R2-1710107; Oct. 13, 2017.

Samsung; "Random Access Procedure for RRC Inactive State"; 3GPP TSG-RAN WG2; #99bis; R2-1707685; Aug. 25, 2017.

U.S. Appl. No. 17/441,330 filed with the USPTO, filed Sep. 21, 2021.

European Extended Search Report dated Jul. 7, 2023 in connection with European Application No. EP20948565.

Non-Final Office Action dated Jan. 9, 2024, for U.S. Appl. No. 17/441,330.

Japanese Office Action, Mailed Date: Dec. 2, 2023, in connection with Japanese Patent Application No. 2022-549055.

Nokia, Nokia Shanghai Bell, On 2-Step RACH Procedure[online], 3GPP TSG RAN WG1 #98 R1-1908342, Internet<URL:https://www.3gpp.org/ftp/tsg_ran/WG1_RL1/TSGR1_98/Docs/R1-1908342.zip>, Aug. 16, 2019.

Nokia, Nokia Shanghai Bell; "On 2-step RACH Procedure"; 3GPP TSG RAN WG1 #98; R1-1908342; Aug. 26, 2019.

Change Request; Nokia (rapporteur), Nokia Shanghai Bell; 3GPP TSG-RAN WG2 Meeting #109-e ; R2-2000942; Feb. 24, 2020.

* cited by examiner

USER EQUIPMENT DIRECT TRANSMISSION WHILE INACTIVE

REFERENCE TO RELATED APPLICATIONS

This application is a National Phase entry application of International Patent Application No. PCT/CN2020/107404 filed Aug. 6, 2020, entitled "USER EQUIPMENT DIRECT TRANSMISSION WHILE INACTIVE", the contents of which are herein incorporated by reference in their entirety.

BACKGROUND

The random access channel (RACH) process is used by user equipment (UE) to establish synchronization with a base station and obtain a network identifier and resources for transmitting uplink data.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
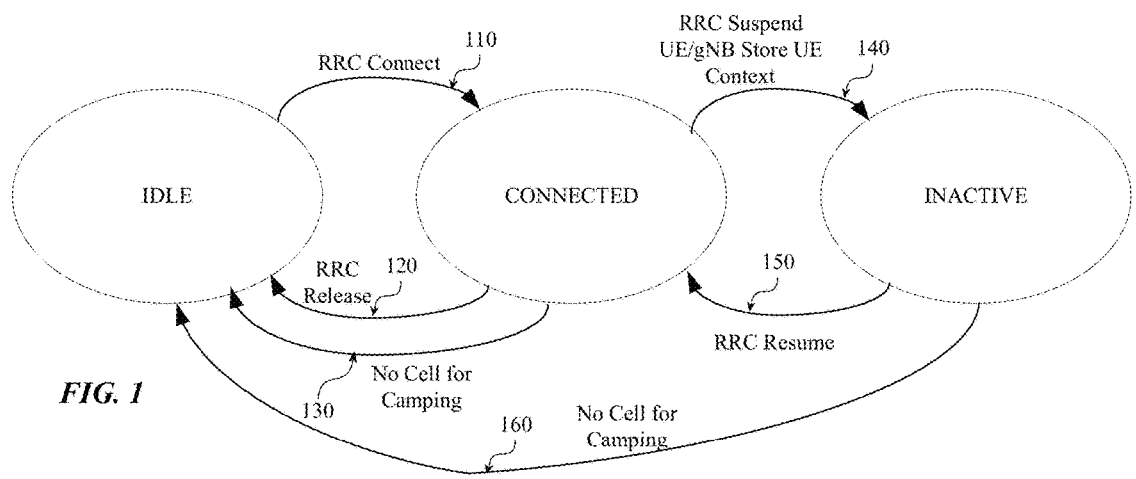
FIG. 1 is a state diagram of UE radio resource control (RRC) states.

FIG. 1 is a state diagram illustrating the three radio resource control (RRC) states in which a UE may operate. In the IDLE state, the UE is disconnected from the core network (CN). While in IDLE the UE performs cell re-selection and can receive paging messages from the CN by way of the cell on which the UE is camping. To enter the CONNECTED state, the UE performs an RRC Connect process 110 in which the UE uses the random access channel (RACH) process (described in more detail below) to connect to the CN and radio access network (RAN). In the CONNECTED state, the UE is connected to and registered with the CN. Control and User plane connections are established between the RAN and the CN for the UE. The RAN is aware of which cell the UE belongs to and all parameters necessary for unicast communication between the UE and RAN are known to both the UE and the RAN. A UE context that includes an access stratum (AS) context of the UE (e.g., the UE's cell radio network temporary identifier (C-RNTI), and Cell Identity of the Primary Cell) and an RRC configuration for the UE (e.g., radio bearer and security information) are stored in the RAN and also in the UE.

From the CONNECTED state, the UE may move back to the IDLE state by performing an RRC Release process 120. When the UE returns to the IDLE state, the UE context is deleted from the UE and the RAN. The UE may also enter the IDLE state by default from either the CONNECTED state or the INACTIVE state when a cell for camping cannot be found as indicated by 130, 160, respectively.

The INACTIVE state was introduced in 5G to provide an intermediate state between the IDLE and CONNECTED states that would expedite the re-connection process by eliminating some of the signaling used to transition from the IDLE state to the CONNECTED state. The INACTIVE state is beneficial for UEs that infrequently communicate with the RAN and allows for power saving as compared to these UEs remaining in the CONNECTED state. To enter the INACTIVE state, the UE performs an RRC Suspend process 140 in which the UE context is stored by both the UE and the serving gNB and then the RRC Release process occurs. In the INACTIVE state, the UE still has a non-access stratum (NAS) connection with the CN (i.e., is still in a connection management (CM)-CONNECTED state as opposed to the IDLE state in which the UE is not CM-CONNECTED).

While in the INACTIVE state, the UE may move within a RAN notification area (RNA) without notifying the RAN, perform cell re-selection, and receive paging messages from the RAN. However, the UE does not have dedicated AS resources for performing unicast communication and thus cannot perform any dedicated data transmission or reception. Since the UE cannot perform dedicated data reception while in INACTIVE state, when downlink data is to be transmitted to the UE, the RAN pages the UE to trigger the UE to enter the CONNECTED state. When the UE has uplink data to be transmitted, the UE enters the CONNECTED state first before transmitting the uplink data.

To enter the CONNECTED state from the INACTIVE state, the UE performs an RRC Resume process 150 in which the UE context is fetched from the UE's last serving cell and restored to the UE and the (new) serving cell. The RRC Resume process expedites the transition to the CONNECTED state as compared to transitioning from the IDLE state from the CONNECTED state by allowing resumption of the previous connection without having to perform extensive NAS signaling.

Figure 2:
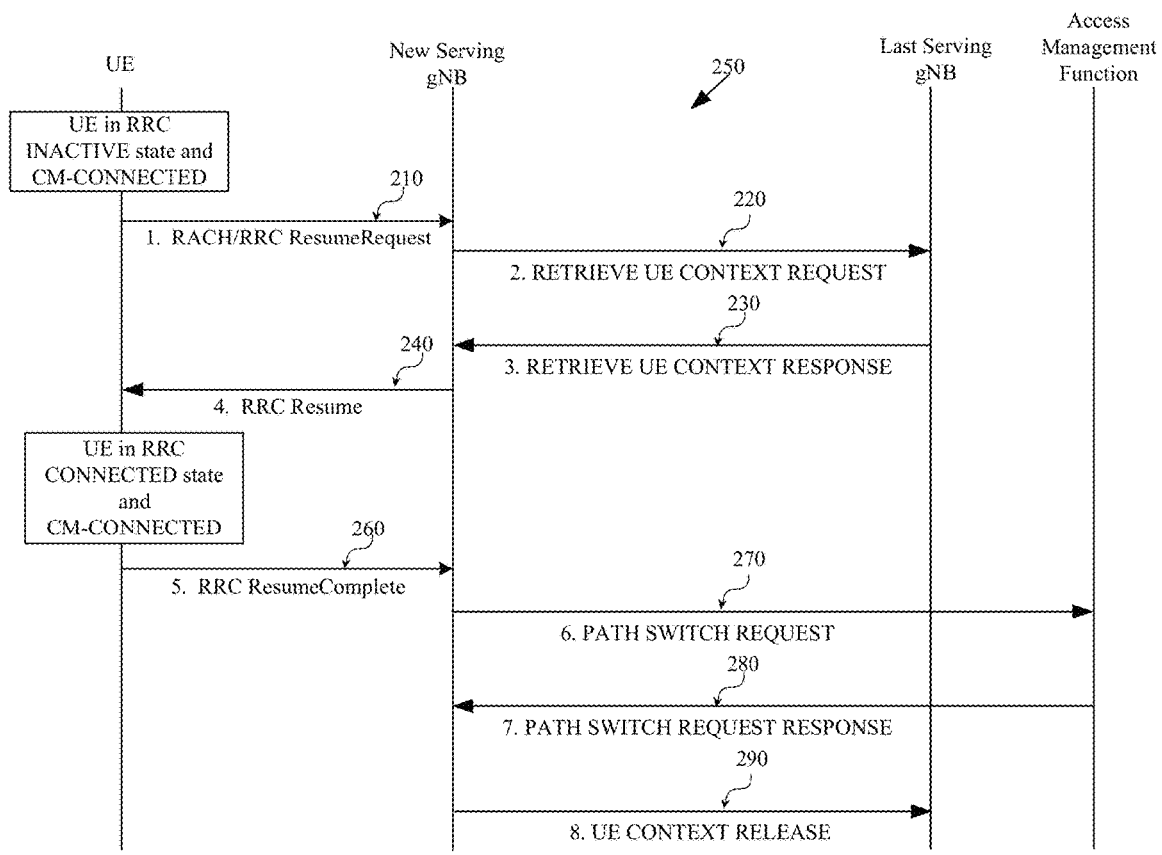
FIG. 2 is a flow diagram of an exemplary RRC Resume process.

An example RRC resume process 250 is outlined in FIG. 2. The UE is initially in the INACTIVE state. At 210 the UE uses a RACH process to communicate an RRC ResumeRequest to the gNB on which it is camping. The RRC ResumeRequest includes an inactive radio network temporary identifier (I-RNTI) for the UE, which is allocated to the UE by the network when the UE enters the inactive state. The network uses the I-RNTI provided with the ResumeRequest to identify the UE and the last serving cell so that the new serving cell may fetch the UE context from the last serving cell.

The UE uses a RACH process to contact the network when the UE wishes to communicate with the network and does not have allocated UL resources. Thus, the UE uses the RACH process to transmit the ResumeRequest to the network. There are two types of RACH processes—contention based RACH (CBRA) and contention free RACH (CFRA). In CBRA, the UE randomly selects a preamble used to identify the UE in the initial message with the network. In CFRA, the preamble is assigned to the UE by the network when the UE enters a state in which the UE does not have allocated UL resources. CFRA will be discussed in more detail within the context of an INACTIVE UE performing direct transmission using CFRA.

Figure 3A:
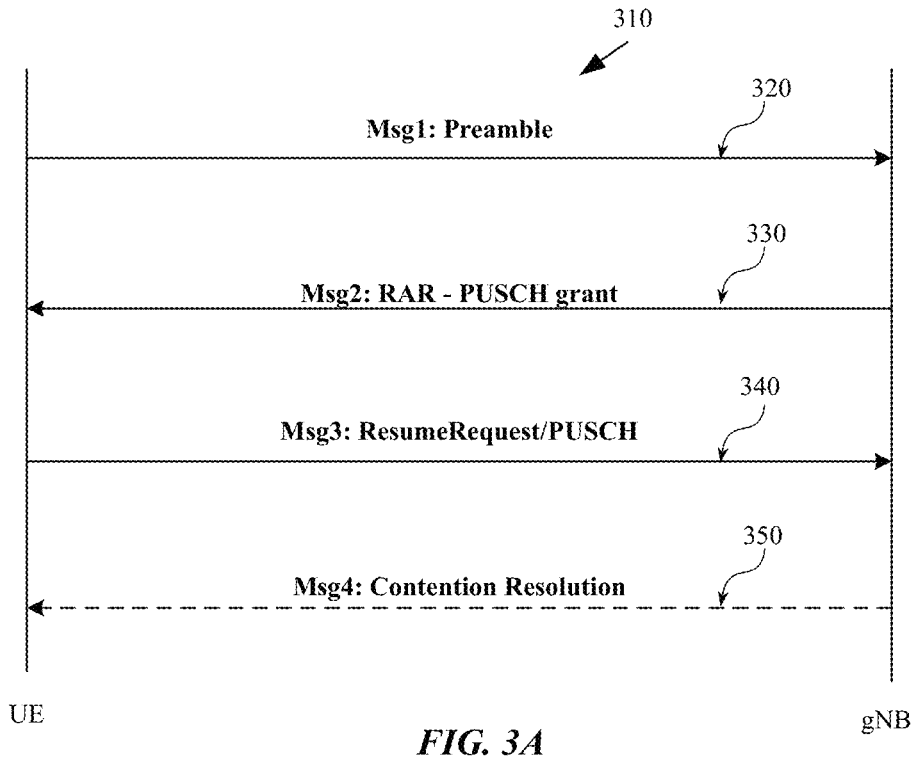
FIG. 3A is a flow diagram of an exemplary four-step RACH process employed by a UE to perform the RRC Resume process of FIG. 4.
Figure 3B:
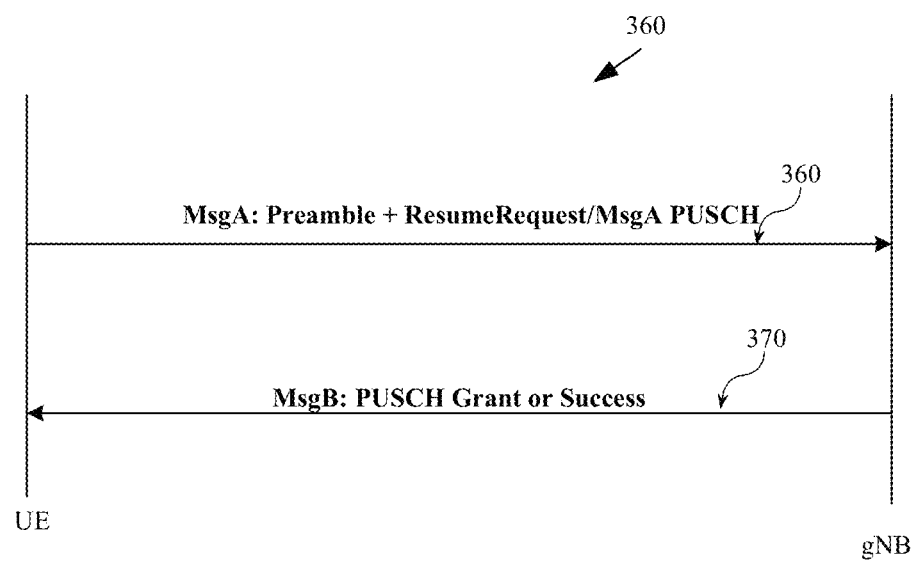
FIG. 3B is a flow diagram of an exemplary two-step RACH process employed by a UE to perform the RRC Resume process of FIG. 4.

Two types of a contention-based RACH (CBRA) process 310 and 360 that may be used to communicate the RRC ResumeRequest are illustrated in more detail in FIGS. 3A and 3B. While the RACH process is described here in the context of communicating a ResumeRequest, the RACH process is used by the UE any time an UE desires to achieve uplink synchronization with the gNB, to enter the CONNECT state from the IDLE or INACTIVE state, or to obtain resources for uplink transmission in the CONNECT state.

FIG. 3A illustrates a 4 step contention-based RACH (CBRA) process. At 320, using a predetermined PRACH occasion, the UE transmits Msg1 which includes a preamble that identifies the UE. In CBRA the preamble is randomly selected by the UE from a set of possible preambles. In another type of RACH process, contention-free RACH (CFRA), the preamble and optionally also dedicated PRACH resources are configured to the UE when the UE enters the INACTIVE or IDLE state. Because in CBRA it is possible that another UE selects the same preamble via the same PRACH resource, CBRA includes a contention resolution step 350 as will be described below. Along with the preamble, the UE also indicates a response window during which the UE expects a response from the gNB. If the UE does not receive a response within the window, the UE will re-transmit the preamble and/or take other remedial action.

At 330, the gNB transmits Msg2 containing a RACH response (RAR) that includes downlink control information (DCI) that is scrambled based on the preamble transmitted by the UE. The DCI includes information that allows the UE to decode a physical downlink shared channel (PDSCH) that communicates an identifier for the UE as well as an allocation of UL resources for use by the UE. At 340, the UE transmits Msg3 using the UL resources received in the RAR. In the instant example, Msg3 will include the ResumeRequest. In other examples, the Msg3 may include other data.

The UE sets a contention timer upon sending Msg3 and monitors the physical downlink control channel (PDCCH) for Msg4, which is sent by the gNB at 350. Msg4 includes a level 2 media access control physical data unit (L2 MAC PDU) that includes a Contention Resolution MAC control element (CE) used by the UE to determine whether the RACH process was successful or not. When the UE does not receive Msg4 before the timer expires it is assumed that the RACH process was not successful. At this point, the UE has successfully notified the gNB of its intention to enter the CONNECT state (e.g., step 210 of FIG. 2 is complete).

FIG. 3B illustrates a two step CBRA process 360. At 370, the UE transmits MsgA which includes the information sent in Msg1 and Msg3 of the 4 step RACH process of FIG. 3A. MsgA includes the randomly selected preamble transmitted on PRACH resources as well as the RRC ResumeRequest which is transmitted using PUSCH resources. At 380 the gNB transmits MsgB which can include a fallback RAR that includes an uplink grant for the UE to re-transmit MsgA when the gNB detects MsgA but cannot decode it. If the gNB successfully decodes MsgA, MsgB includes a success RAR that may include a new UL/DL grant for subsequent communication of data (not re-transmission of the RRC ResumeRequest). At this point, the UE has successfully notified the gNB of its intention to enter the CONNECT state (e.g., step 210 of FIG. 2 is complete). In CFRA, at 360 a pre-assigned preamble and dedicated PRACH resources (assigned by the gNB) may used.

Returning to the RRC Resume process outlined in FIG. 2, at 220 after the ResumeRequest has been received by the gNB, the gNB requests the UE context information that was stored by the last serving gNB as part of the RRC Suspend process. At 230, the last serving gNB provides the UE context information to the new serving gNB. At 240, the gNB communicates an RRC Resume message to the UE to indicate that the UE may enter the CONNECTED state. At 260, the UE indicates to the gNB that the UE has successfully entered the CONNECTED state. At 270, the gNB transmits a Path Switch request that updates the radio bearers for the UE to the Access and Mobility Management Function (AMF), which is the gNB's interface with the CN. At 280, the AMF responds to the gNB confirming the path switch is complete. At 290 the gNB informs the last serving gNB that it can delete the UE context. After these communications have occurred, the UE may transmit data to and receive data from the gNB.

Figure 4A:
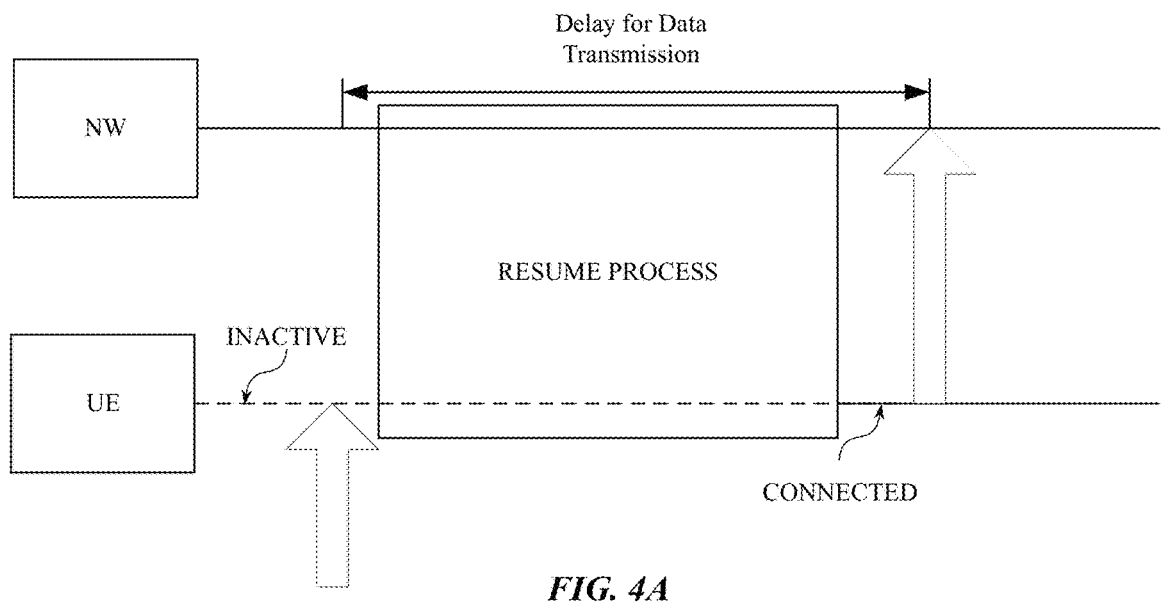
FIG. 4A is a flow diagram illustrating a delay between data arrival at a UE in the INACTIVE state and data transmission by the UE after transitioning to the CONNECTED state.
Figure 4B:
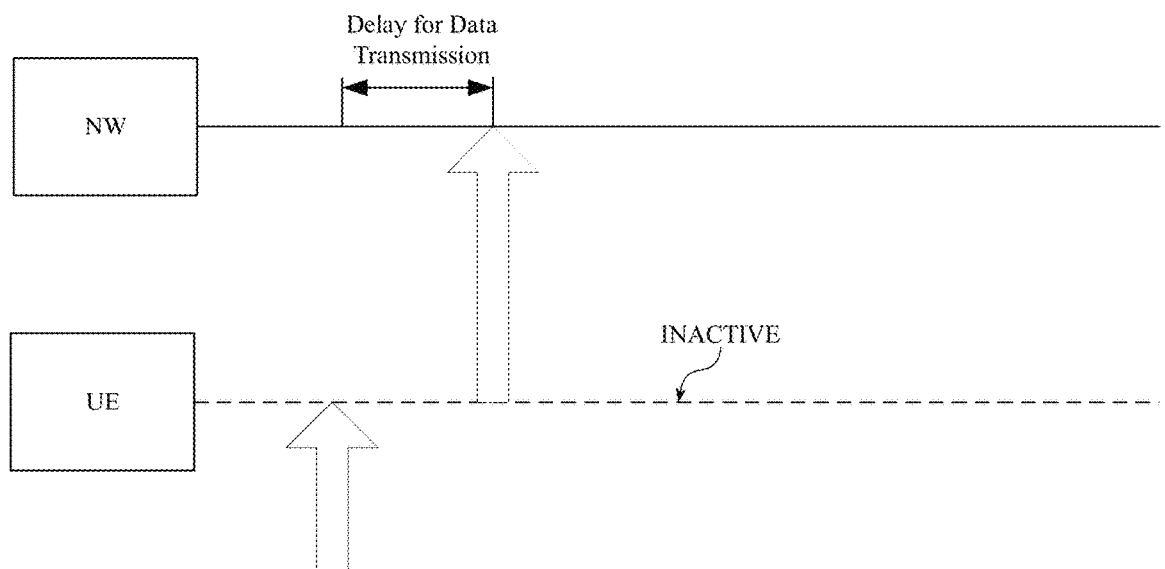
FIG. 4B is a flow diagram illustrating reduced latency between data arrival at a UE in the INACTIVE state and data transmission by the UE remaining in the INACTIVE state.

Referring to FIG. 4A, it can be seen that the resume process introduces significant delay between when the UE has data to transmit and the UE is able to transmit the data. Disclosed herein are systems, circuitries, and techniques for allowing the UE to perform direct transmission of data to a gNB using CFRA while in the INACTIVE state without transitioning to the CONNECTED state, as illustrated in FIG. 4B.

In CFRA, the network can identify a UE via a dedicated physical random access channel (PRACH) resource (e.g., resources that can be used to transmit RACH message or data) and/or a dedicated preamble resource (e.g., a preamble that is assigned to the UE for transmission using preamble resources). The dedicated PRACH resource and/or dedicated preamble resource is referred to herein as a "dedicated PRACH/preamble resource" that is configured to the UE by the network. The dedicated PRACH/preamble configuration is configured to the UE via RRC or a physical downlink control channel (PDCCH) order and is valid within the serving cell. CFRA is triggered by the following events: uplink sync, downlink data arrival, handover, and beam failure recovery. Extension of the CFRA is proposed herein in which the dedicated PRACH/preamble resource is used to identify an INACTIVE UE so that the UE may transmit uplink data. The UE uses the dedicated PRACH/preamble resource to establish a CFRA process in which the UE performs direct uplink transmission while in the INACTIVE state.

Figure 5A:
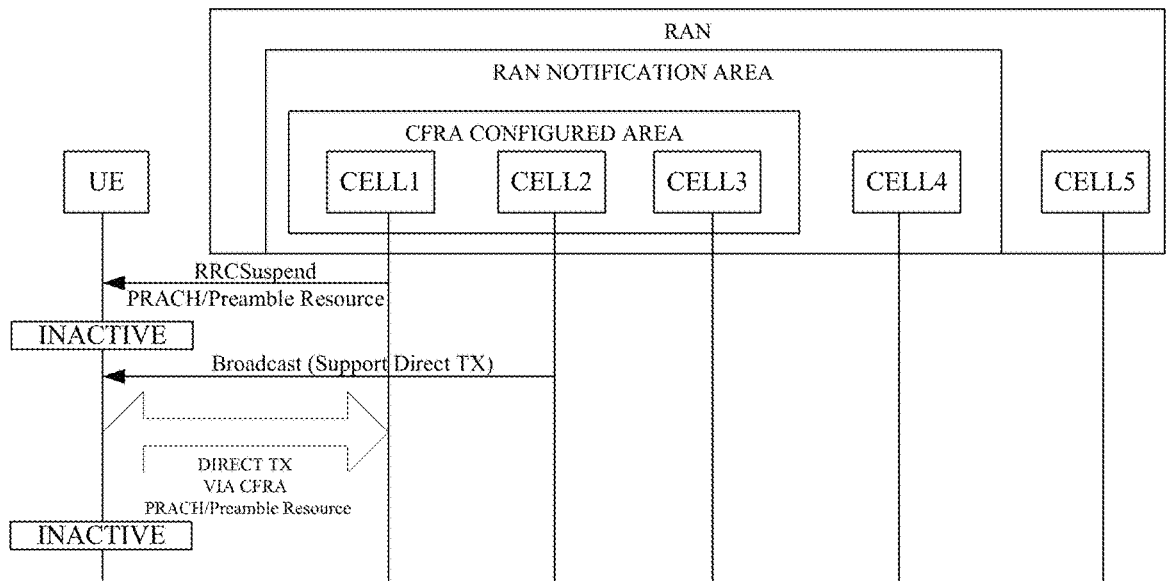
FIGS. 5A and 5B are flow diagrams illustrating direct uplink transmission by an INACTIVE UE via a contention free random access (CFRA) process, in accordance with various aspects disclosed.
Figure 5B:
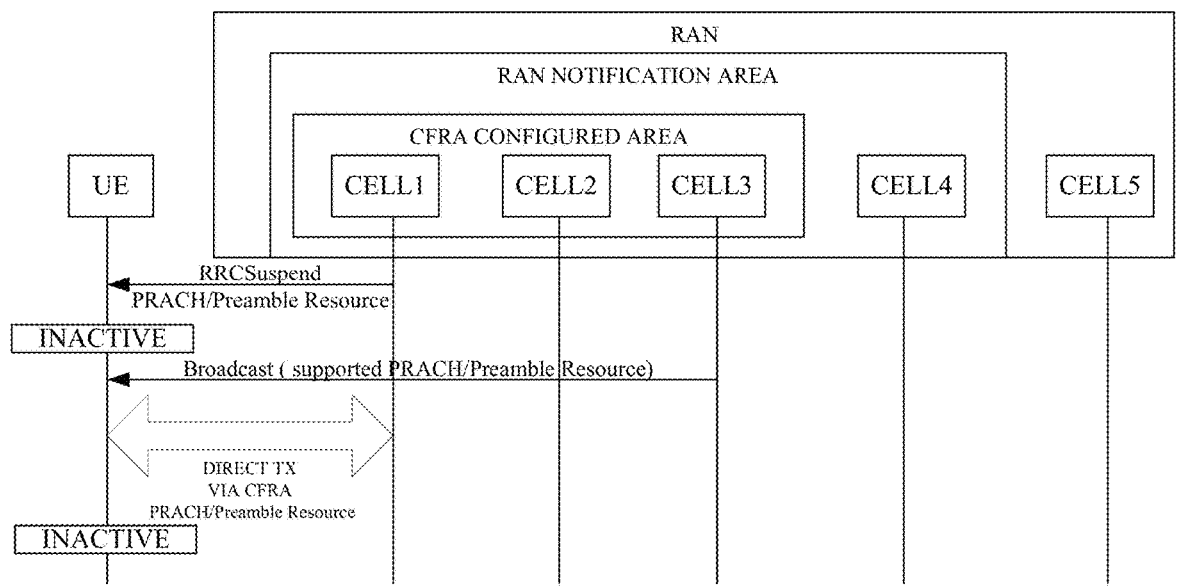

FIGS. 5A and 5B illustrate a network in which a UE roams within a radio access network (RAN) that includes five cells. The UE accesses a core network by way of one or more cells of the RAN. For the purposed of this description a "cell" means a collection of infrastructure equipment, such as base stations, eNBs, gNBs, and so on that serve a given geographic area. When the UE is in a CONNECTED or INACTIVE state, the UE selects and camps on at least one cell (e.g., a serving cell). When the UE is exchanging messages or data with a base station or gNB, it is to be understood that these terms are a shorthand for any infrastructure equipment that makes up a serving cell for the UE. The RAN includes a RAN notification area that includes cells 1-4. The UE may roam within the RAN notification area without notifying the RAN because cells 1-4 all broadcast paging messages for any UE having a serving cell within the RAN notification area. The RAN also includes a CFRA configured area that includes cells that support direct uplink transmission by INACTIVE UE using the CFRA.

The network (by way of serving cell 1) assigns the UE a dedicated PRACH/preamble resource as part of an RRC suspend process. While in the INACTIVE state, the UE identifies uplink data to be transmitted to the network. If cell 1 is still the serving cell for the UE, the UE may perform CFRA using the dedicated PRACH/preamble resource it received in the RRC Suspend process to transmit the uplink data to the network by way of cell 1.

If however, the UE has performed cell re-selection and now is camping on cell 3 (which is within the CFRA configured area), a question arises as to how the new serving cell allocates the dedicated PRACH/preamble resource to the UE for direct uplink transmission. In one example, as illustrated in FIG. 5A, each cell in the CFRA configured area broadcasts a message indicating that the cell supports direct uplink transmission by INACTIVE UE. In this example, the UE may assume that it may use the dedicated PRACH/preamble resource it received in the RRC Suspend process to transmit uplink data using CFRA to any cell that transmits the message.

In another example, illustrated in FIG. 5B, the broadcast message includes which "supported" PRACH/preamble resources are configured for the cell. In this example, the UE may assume that it may use the dedicated PRACH/preamble resource it received in the RRC Suspend process to transmit uplink (using CFRA) only to a cell that broadcasts a message in which the supported PRACH/preamble resource matches the dedicated PRACH/preamble resource. In another example, not illustrated, the broadcast message includes which "supported" PRACH/preamble resources are configured for direct transmission by INACTIVE UE for the cell.

In this example, the UE may assume that it may use the dedicated PRACH/preamble resource it received in the RRC Suspend process to transmit uplink data (using CFRA) only to a cell that broadcasts a message in which the supported PRACH/preamble resource matches the dedicated PRACH/preamble resource.

In another example, the network configures a dedicated preamble resource to the UE during the RRC Suspend process and the UE acquires the dedicated PRACH/preamble resource from a broadcast message that is broadcast by each cell on which the UE is camping. The UE may use the dedicated preamble to perform direct uplink transmission (using CFRA) using any PRACH resources configured by a broadcast message of a given camping cell. Alternatively, the UE may use the dedicated preamble to perform direct uplink transmission (using CFRA) with any camping cell that broadcasts a message indicating that the cell supports direct uplink transmission using dedicated PRACH/preamble resources. Alternatively, the UE may use the dedicated preamble to perform direct uplink transmission (using CFRA) with any camping cell that broadcasts a message indicating that the cell supports direct uplink transmission.

Figure 6:
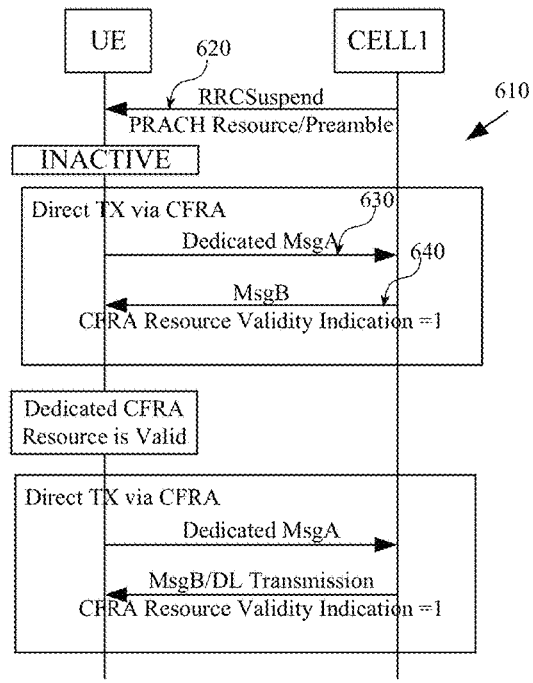
FIG. 6 is a flow diagram illustrating direct uplink transmission by an INACTIVE UE via CFRA using a resource validity indicator, in accordance with various aspects disclosed.

FIG. 6 illustrates a message flow 610 outlining an example of direct uplink transmission using CFRA. At 620 the network (e.g., cell 1) configures a UE entering the INACTIVE state with a dedicated PRACH/preamble resource. While in the INACTIVE state, the UE performs direct uplink transmission using CFRA and the dedicated PRACH/preamble resource. At 630, the UE transmits a MsgA of a two-step RACH process to the cell using the dedicated PRACH/preamble resource. The MsgA includes the uplink data. In response, at 640, the cell transmits MsgB of a two-step RACH process that includes a CFRA Resource Validity Indication value. When the CFRA Resource Validity Indication value is 1, the dedicated PRACH/preamble resource is still valid for future direct uplink transmission using CFRA. If the CFRA Resource Validity Indication value is 0, the dedicated PRACH/preamble resource is not valid for future direct uplink transmission using CFRA. In one example, the CFRA Resource Validity Indication value is communicated using an L2 Control packet data unit (PDU) (e.g., media access control (MAC) control element (CE)). In another example, the cell provides the dedicated PRACH/preamble resource for a next direct uplink transmission using CFRA via an L2 Control PDU (e.g., MAC CE).

Figure 7:
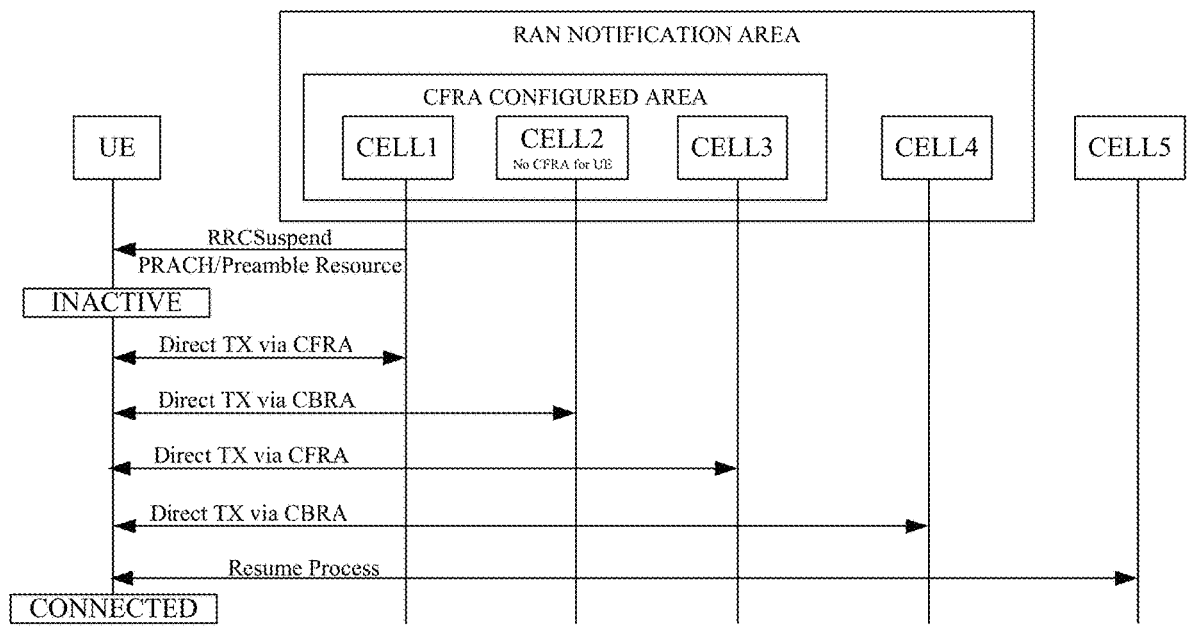
FIG. 7 is a flow diagram illustrating direct uplink transmission by an INACTIVE UE with various cells in a network, in accordance with various aspects disclosed.

FIG. 7 is a flow diagram outlining one example of the modes in which a UE may transmit uplink data to different cells in a network that is configured as the network of FIGS. 5A and 5B. Note that cell 2 does not support direct uplink transmission using CFRA for the UE even though cell 2 is in the CFRA configured area. The UE receives a configured dedicated PRACH/preamble resource from cell 1 during an RRC Suspend process and enters INACTIVE state. While in the INACTIVE state, the UE may perform direct uplink transmission using CFRA with both cell 1 (the serving cell that configured the dedicated PRACH/preamble resource) and cell 3, which is in the CFRA configured area. The UE may perform direct uplink transmission using contention based random access (CBRA) with cell 2 (which does not support direct uplink transmission using CFRA for the UE) and also cell 4, which is within the RAN Notification area. To transmit uplink data to cell 5, which is outside the RAN notification area, the UE triggers the RRC Resume process to enter the CONNECTED state and transmits the uplink data while CONNECTED. Alternatively, the UE may perform direct uplink transmission using CBRA with cell (outside the RAN notification area) in some examples.

Figure 8:
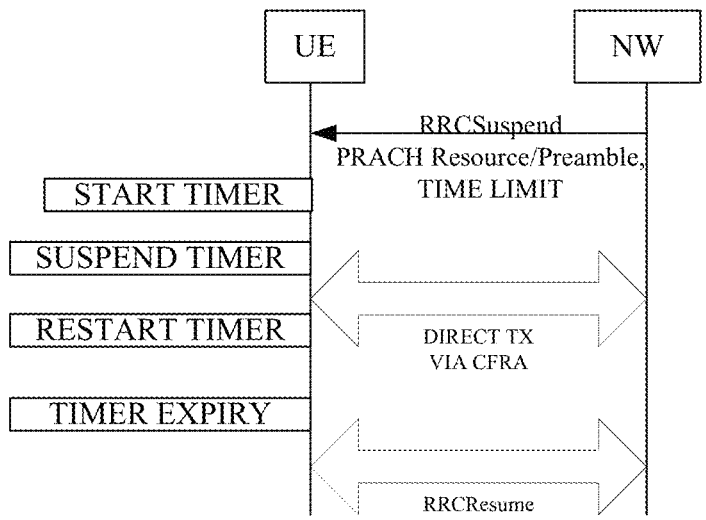
FIG. 8 is a flow diagram illustrating direct uplink transmission by an INACTIVE UE via CFRA using a timer, in accordance with various aspects disclosed.

FIG. 8 is flow diagram outlining exemplary use of a timer to limit the validity of the dedicated PRACH/preamble resource. The UE receives the dedicated PRACH/preamble resource and a TIME LIMIT value during the RRC Suspend process. At this point the UE starts a timer. The UE suspends the timer while the UE performs direct uplink transmission using CFRA and restarts the time after the uplink transmission is complete. The dedicated PRACH/preamble resource is suspended or deleted by the UE upon expiry of the timer (e.g., when the timer value reaches the TIME LIMIT) or upon entering the CONNECTED state.

Figure 9A:
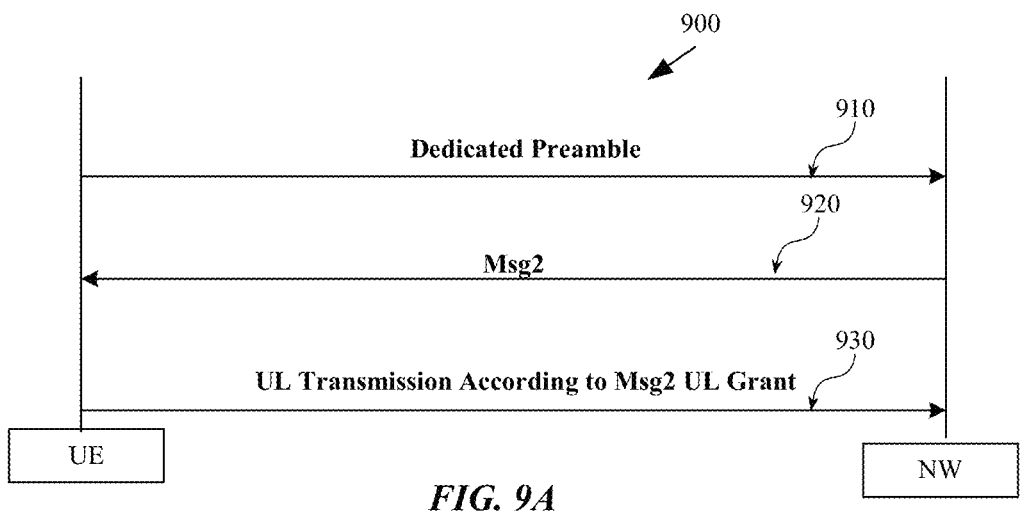
FIGS. 9A and 9B are flow diagrams illustrating direct uplink transmission by an INACTIVE UE via a four-step CFRA, in accordance with various aspects disclosed.

FIG. 9A illustrates a flow diagram outlining a four-step CFRA process 900 that may be used by a UE for direct uplink transmission while INACTIVE. At 910, the UE transmits the dedicated preamble in a Msg1 and starts a RAR window. At 920, the network (e.g., cell or base station) transmits a Msg2 (RAR) within the RAR window that includes an uplink grant, meaning that the CFRA process was successful. At 930, the UE, while still INACTIVE, transmits the uplink data according to the uplink grant in Msg2. The network may provide a validity timer or CFRA Resource Validity Indication value in Msg2.

Figure 9B:
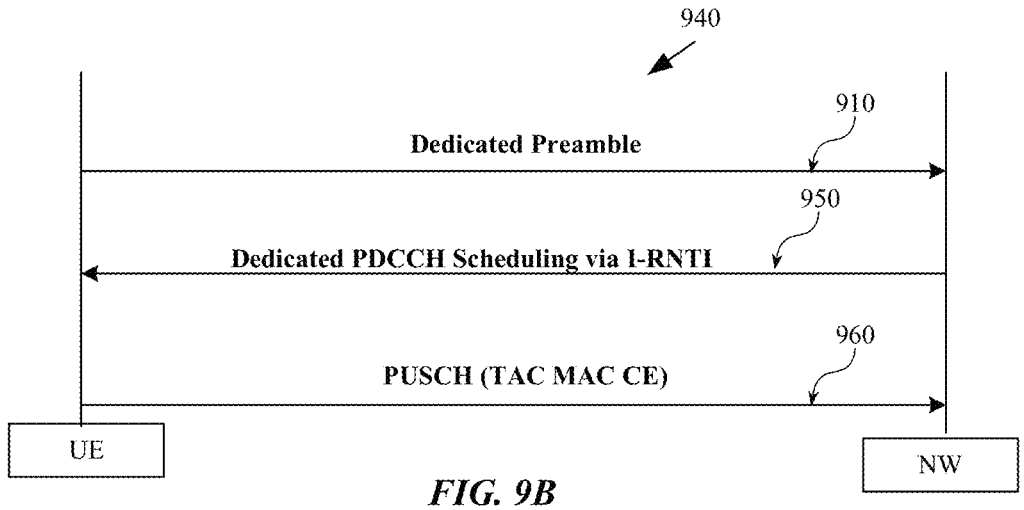

FIG. 9B illustrates a flow diagram outlining a four-step process 940 that may be used by a UE for direct uplink transmission while INACTIVE. At 910, the UE transmits the dedicated preamble to the network (e.g., cell or base station). At 950, the network transmits a dedicated physical downlink control channel (PDCCH) scheduling that is scrambled using an INACTIVE radio network temporary identifier (I-RNTI) assigned to the UE when the UE entered the INACTIVE state. The dedicated PDCCH schedules a PUSCH transmission of a tracking area code (TAC) MAC CE. At 960, the UE, while still INACTIVE, transmits the uplink data by way of a TAC MAC CE according to the dedicated PDCCH scheduling.

Figure 10A:
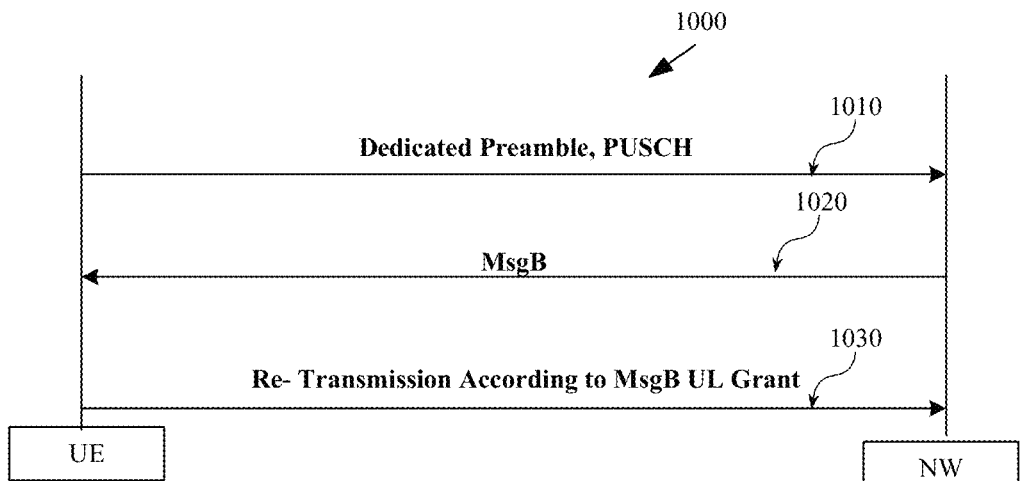
FIGS. 10A and 10B are flow diagrams illustrating direct uplink transmission by an INACTIVE UE via a two-step CFRA, in accordance with various aspects disclosed.

FIG. 10A illustrates a flow diagram outlining a two-step CFRA process 1000 that may be used by a UE for direct uplink transmission while INACTIVE. At 1010, the UE transmits the dedicated preamble and the uplink data in a MsgA-PUSCH resource and starts the MsgB window. At 1020, the network (e.g., cell or base station) transmits a MsgB that includes an uplink grant within the MsgB window, meaning that the network was unable to decode the uplink transmission. At 1030, the UE, while still INACTIVE, transmits the uplink data according to the uplink grant in MsgB. If instead of a MsgB, the UE receives a new uplink grant, the UE is informed that the uplink transmission was successful and may transmit subsequent data by way of the new uplink grant. The network may provide a validity timer or CFRA Resource Validity Indication value in MsgB.

Figure 10B:
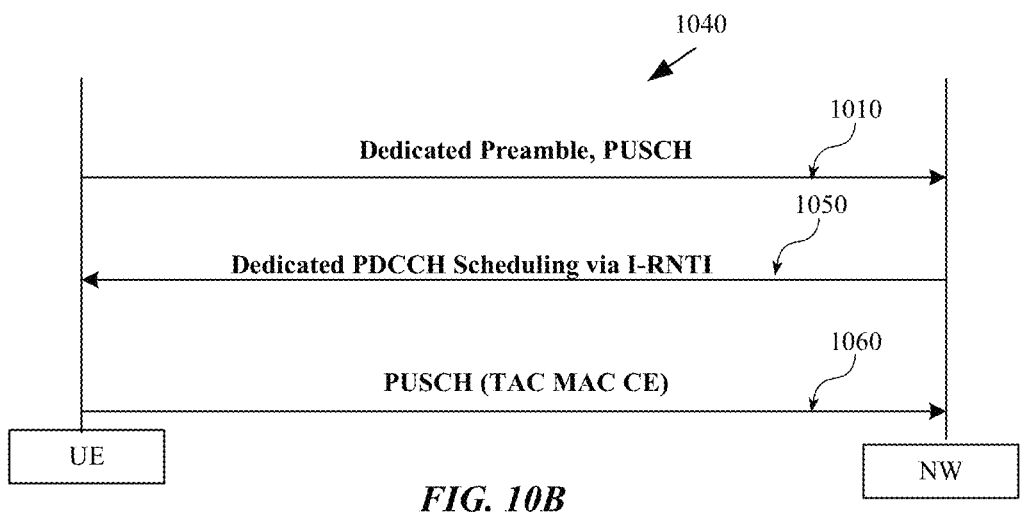

FIG. 10B illustrates a flow diagram outlining a two-step process 1040 that may be used by a UE for direct uplink transmission while INACTIVE. At 1010, the UE transmits the dedicated preamble and uplink data in PUSCH resources. At 1050, the network transmits a dedicated PDCCH scheduling that is scrambled using an I-RNTI assigned to the UE when the UE entered the INACTIVE state. The dedicated PDCCH schedules a PUSCH transmission of a tracking area code TAC MAC CE by the UE that communicates the uplink data. At 1060, the UE, while still INACTIVE, transmits the uplink data by way of a TAC MAC CE according to the dedicated PDCCH scheduling.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

Figure 11:
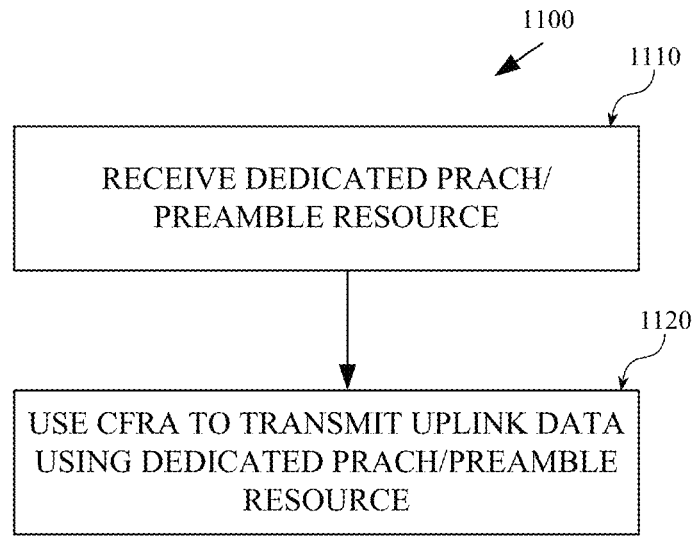
FIG. 11 is a flow diagram illustrating an exemplary method for performing direct uplink transmission by an INACTIVE UE via CFRA, in accordance with various aspects disclosed.

FIG. 11 depicts a flow diagram outlining a method 1100 to be performed by a UE. The method includes, at 1110, receiving a dedicated PRACH/preamble resource from a network. At 1120, the method includes while in an INACTIVE state, without entering a CONNECTED state, using CFRA to transmit uplink data using the dedicated PRACH/preamble resource.

Figure 12:
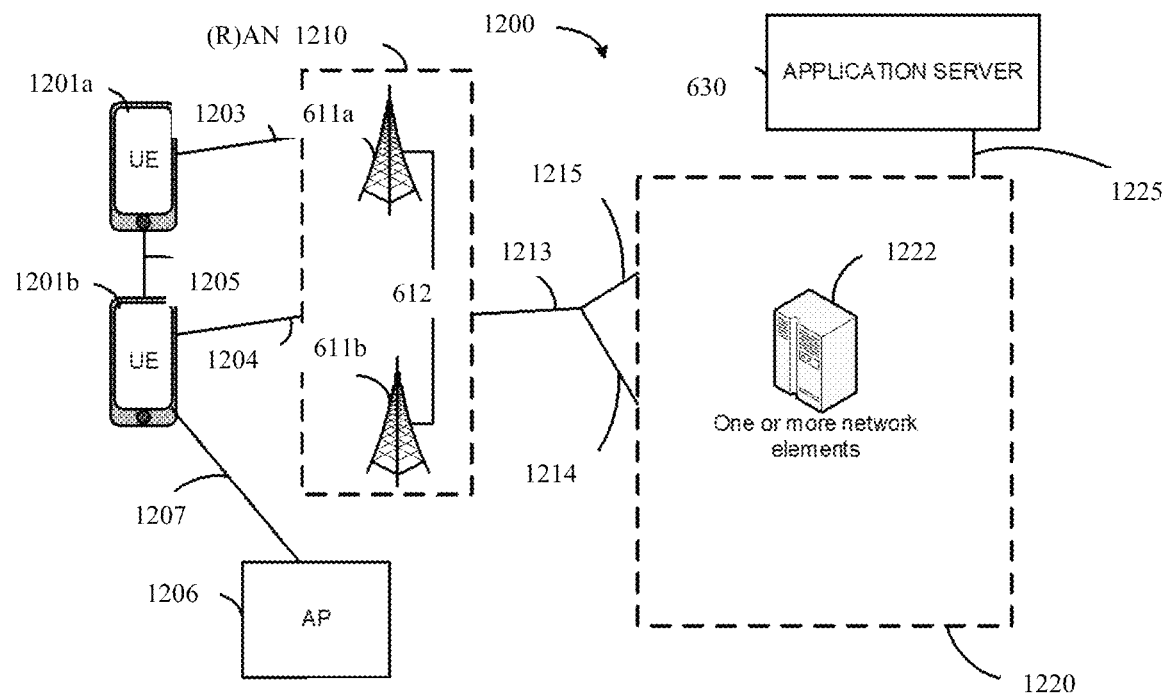
FIG. 12 illustrates an example communication network, in accordance with various aspects disclosed.

FIG. 12 illustrates an example architecture of a system 1200 of a communication network, in accordance with various aspects. The following description is provided for an example system 1200 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 12, the system 1200 includes UE 1201a and UE 1201b (collectively referred to as "UEs 1201" or "UE 1201"). In this example, UEs 1201 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some aspects, any of the UEs 1201 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 may be configured to connect, for example, communicatively couple, with a RAN 1210. In aspects, the RAN 1210 may be an NG RAN or a 5G RAN, an E-UTRAN, or a legacy RAN, such as a UTRAN or GERAN. As used herein, the term "NG RAN" or the like may refer to a RAN 1210 that operates in an NR or 5G system 1200, and the term "E-UTRAN" or the like may refer to a RAN 1210 that operates in an LTE or 4G system 1200. The UEs 1201 utilize connections (or channels) 1203 and 1204, respectively, each of which comprises a physical communications interface or layer (discussed in further detail below).

In this example, the connections 1203 and 1204 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 1201 may directly exchange communication data via a ProSe interface 1205. The ProSe interface 1205 may alternatively be referred to as a SL interface 1205 and may comprise one or more logical channels, including but not limited to a PSCCH, a PSSCH, a PSDCH, and a PSBCH.

The UE 1201b is shown to be configured to access an AP 1206 (also referred to as "WLAN node 1206," "WLAN 1206," "WLAN Termination 1206," "WT 1206" or the like) via connection 1207. The connection 1207 can comprise a local wireless connection, such as a connection consistent with any IEEE 702.11 protocol, wherein the AP 1206 would comprise a wireless fidelity (Wi-Fi®) router. In this example, the AP 1206 is shown to be connected to the Internet without connecting to the core network of the wireless system (described in further detail below). In various aspects, the UE 1201b, RAN 1210, and AP 1206 may be configured to utilize LWA operation and/or LWIP operation. The LWA operation may involve the UE 1201b in RRC_CONNECTED being configured by a RAN node 1211a-b to utilize radio resources of LTE and WLAN. LWIP operation may involve the UE 1201b using WLAN radio resources (e.g., connection 1207) via IPsec protocol tunneling to authenticate and encrypt packets (e.g., IP packets) sent over the connection 1207. IPsec tunneling may include encapsulating the entirety of original IP packets and adding a new packet header, thereby protecting the original header of the IP packets.

The RAN 1210 can include one or more AN nodes or RAN nodes 1211a and 1211b (collectively referred to as "RAN nodes 1211" or "RAN node 1211") that enable the connections 1203 and 1204. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 1211 that operates in an NR or 5G system 1200 (for example, a gNB), and the term "E-UTRAN node" or the like may refer to a RAN node 1211 that operates in an LTE or 4G system 1200 (e.g., an eNB). According to various aspects, the RAN nodes 1211 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various aspects, the UEs 1201 and the RAN nodes 1211 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 1201 and the RAN nodes 1211 may operate using LAA, eLAA, and/or feLAA mechanisms. In these implementations, the UEs 1201 and the RAN nodes 1211 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 1201 RAN nodes 1211, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 1201, AP 1206, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 1201 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 1201. The PDCCH carries information about the transport format and resource allocations related to the PDSCH channel, among other things. It may also inform the UEs 1201 about the transport format, resource allocation, and HARQ information related to the uplink shared channel. Typically, downlink scheduling (assigning control and shared channel resource blocks to the UE 1201b within a cell) may be performed at any of the RAN nodes 1211 based on channel quality information fed back from any of the UEs 1201. The downlink resource assignment information may be sent on the PDCCH used for (e.g., assigned to) each of the UEs 1201.

The RAN 1210 is shown to be communicatively coupled to a core network—in this aspect, core network (CN) 1220. The CN 1220 may comprise a plurality of network elements 1222, which are configured to offer various data and telecommunications services to customers/subscribers (e.g., users of UEs 1201) who are connected to the CN 1220 via the RAN 1210. The components of the CN 1220 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 1220 may be referred to as a network slice, and a logical instantiation of a portion of the CN 1220 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 13:
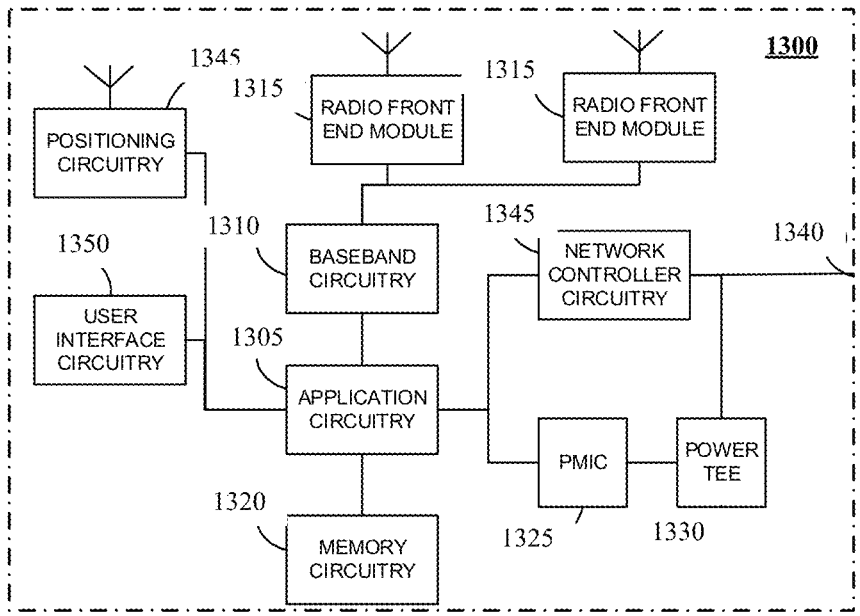
FIG. 13 illustrates an example of an infrastructure equipment device (e.g., BS, eNB, gNB), in accordance with various aspects disclosed.

FIG. 13 illustrates an example of infrastructure equipment 1300 in accordance with various aspects. The infrastructure equipment 1300 (or "system 1300") may be implemented as a base station, radio head, RAN node such as the RAN nodes 1211 and/or AP 1206 shown and described previously, application server(s) 1230, and/or any other element/device discussed herein. In other examples, the system 1300 could be implemented in or by a UE.

The system 1300 includes application circuitry 1305, baseband circuitry 1310, one or more radio front end modules (RFEMs) 1315, memory circuitry 1320, power management integrated circuitry (PMIC) 1325, power tee circuitry 1330, network controller circuitry 1335, network interface connector 1340, satellite positioning circuitry 1345, and user interface 1350. In some aspects, the device 1300 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1305 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1305 may be coupled with or may include memory/storage elements and may be configured to execute instructions stored in the memory/storage to enable various applications or operating systems to run on the system 1300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1305 may comprise, or may be, a special-purpose processor/controller to operate according to the various aspects herein. As examples, the processor(s) of application circuitry 1305 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1300 may not utilize application circuitry 1305, and instead may include a special-purpose processor/controller to process IP data received from an EPC or 5GC, for example.

User interface circuitry 1350 may include one or more user interfaces designed to enable user interaction with the system 1300 or peripheral component interfaces designed to enable peripheral component interaction with the system 1300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 13 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 14:
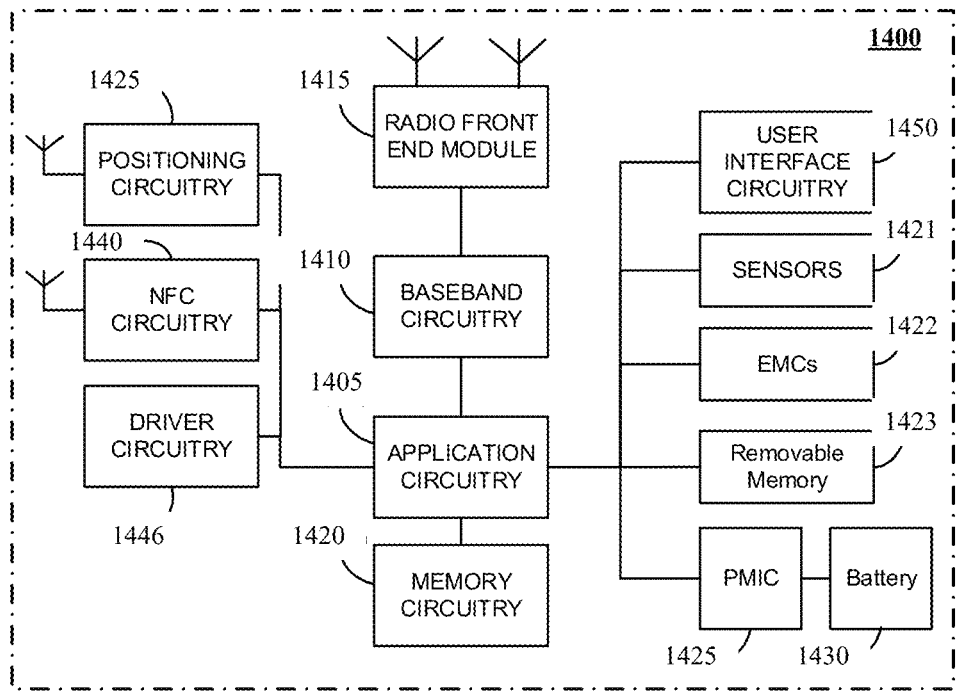
FIG. 14 illustrates an example of a user equipment device (e.g., UE), in accordance with various aspects disclosed.

FIG. 14 illustrates an example of a platform 1400 (or "device 1400") in accordance with various aspects. In aspects, the computer platform 1400 may be suitable for use as UEs 1201, application servers 1230, and/or any other element/device discussed herein. The platform 1400 may include any combinations of the components shown in the example. The components of platform 1400 may be implemented as integrated circuits (ICs), portions thereof, discrete electronic devices, or other modules, logic, hardware, software, firmware, or a combination thereof adapted in the computer platform 1400, or as components otherwise incorporated within a chassis of a larger system. The block diagram of FIG. 14 is intended to show a high level view of components of the computer platform 1400. However, some of the components shown may be omitted, additional components may be present, and different arrangement of the components shown may occur in other implementations.

Application circuitry 1405 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1405 may be coupled with or may include memory/storage elements and may be configured to execute instructions stored in the memory/storage to enable various applications or operating systems to run on the system 1400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1405 may include a general or special purpose processor, such as an A-series processor (e.g., the A13 Bionic), available from Apple® Inc., Cupertino, CA or any other such processor. The processors of the application circuitry 1405 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1405 may be a part of a system on a chip (SoC) in which the application circuitry 1405 and other components are formed into a single integrated circuit, or a single package.

The baseband circuitry 1410 may be implemented, for example, as a solder-down substrate including one or more integrated circuits, a single packaged integrated circuit soldered to a main circuit board or a multi-chip module containing two or more integrated circuits.

The platform 1400 may also include interface circuitry (not shown) that is used to connect external devices with the platform 1400. The external devices connected to the platform 1400 via the interface circuitry include sensor circuitry 1421 and electro-mechanical components (EMCs) 1422, as well as removable memory devices coupled to removable memory circuitry 1423.

A battery 1430 may power the platform 1400, although in some examples the platform 1400 may be mounted deployed in a fixed location, and may have a power supply coupled to an electrical grid. The battery 1430 may be a lithium ion battery, a metal-air battery, such as a zinc-air battery, an aluminum-air battery, a lithium-air battery, and the like. In some implementations, such as in V2X applications, the battery 1430 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus, including one or more processors configured to receive, from a network, configuration of a dedicated physical random access channel (PRACH) resource or a dedicated preamble resource (dedicated PRACH/preamble resource); and while in a radio resource control (RRC) INACTIVE state, without entering an RRC CONNECTED state, use a contention-free random access (CFRA) process to transmit uplink data to a base station using the dedicated PRACH/preamble resource.

Example 2 includes the subject matter of example 1, including or omitting optional elements, wherein the one or more processors are configured to receive the dedicated PRACH/preamble resource from the network during an RRC Suspend process.

Example 3 includes the subject matter of example 1, including or omitting optional elements, wherein the one or more processors are configured to identify a preamble in the dedicated PRACH/preamble resource; transmit the preamble to the base station in a Msg1 of a random access control channel (RACH) process; receive an indication of physical uplink shared channel (PUSCH) resources in a Msg2 of random access control channel (RACH) process; and transmit the uplink data to the base station using the PUSCH resources.

Example 4 includes the subject matter of example 1, including or omitting optional elements, wherein the one or more processors are configured to transmit a dedicated preamble indicated in the dedicated PRACH/preamble resource and the uplink data in a MsgA PUSCH resource associated with a RACH process.

Example 5 includes the subject matter of example 1, including or omitting optional elements, wherein the one or more processors are configured to transmit, to the base station a dedicated preamble indicated in the dedicated PRACH/preamble resource; receive a dedicated physical downlink control channel (PDCCH) scheduling from the base station; and transmit the uplink data on a tracking area code (TAC) media access control (MAC) control element (CE) indicated by the received PDCCH scheduling.

Example 6 includes the subject matter of example 1, including or omitting optional elements, wherein the one or more processors are configured to receive a broadcast message from the base station that indicates whether a cell on which the UE is camping supports direct uplink transmission from INACTIVE UE; and refrain from transmitting the uplink data to the base station when the broadcast message does not indicate that the cell supports direct uplink transmission from INACTIVE UE.

Example 7 includes the subject matter of example 1, including or omitting optional elements, wherein the one or more processors are configured to receive a broadcast message from the base station that indicates whether a cell on which the UE is camping supports direct uplink transmission from INACTIVE UE and identifies a supported PRACH/preamble resource; and refrain from transmitting the uplink data to the base station using CFRA when the supported PRACH/preamble resource is different from the dedicated PRACH/preamble resource.

Example 8 includes the subject matter of example 1, including or omitting optional elements, wherein the one or more processors are configured to receive a broadcast message from the base station that indicates whether a cell on which the UE is camping supports direct uplink transmission from INACTIVE UE and identifies a supported PRACH/preamble resource for direct uplink transmission from INACTIVE UE; and refrain from transmitting the uplink data to the base station using CFRA when the supported PRACH/preamble resource direct uplink transmission from INACTIVE UE is different from the dedicated PRACH/preamble resource.

Example 9 includes the subject matter of example 1, including or omitting optional elements, wherein the one or more processors are configured to receive a broadcast message from the base station that identifies the dedicated PRACH/preamble resource for a cell on which the UE is camping; and transmit the uplink data to the base station using the dedicated PRACH/preamble resource identified in the broadcast message.

Example 10 includes the subject matter of example 1, including or omitting optional elements, wherein the one or more processors are configured to receive, from the base station, a validity indicator that indicates whether the dedicated PRACH/preamble resource is valid or invalid; and refrain from transmitting the uplink data to the base station when the validity indicator indicates that the dedicated PRACH/preamble resource is invalid.

Example 11 includes the subject matter of example 1, including or omitting optional elements, wherein the one or more processors are configured to determine a contention free RACH (CFRA) area that includes a set of cells; and refrain from transmitting the uplink data to the base station using the CFRA process when the base station is not in the set of cells.

Example 12 includes the subject matter of example 11, including or omitting optional elements, wherein the one or more processors are configured to transmit the uplink data as part of a contention based RACH process in response to determining that the base station is not in the set of cells.

Example 13 includes the subject matter of example 11, including or omitting optional elements, wherein the one or more processors are configured to trigger an RRC Resume process in response to determining that the base station is not in the set of cells; enter the RRC CONNECTED state; and transmit the uplink data while in the RRC CONNECTED state.

Example 14 includes the subject matter of example 1, including or omitting optional elements, wherein the one or more processors are configured to receive the dedicated PRACH/preamble resource from the network during an RRC Suspend process; start a timer at completion of the RRC Suspend process; and refrain from transmitting the uplink data using the CFRA process after the timer expires.

Example 15 includes the subject matter of example 14, including or omitting optional elements, wherein the one or more processors are configured to suspend the timer while transmitting the uplink data using the CFRA process; and restart the timer after transmitting the uplink data using the CFRA process.

Example 16 is a method, including, with a user equipment wireless communication device (UE) receiving, from a network, configuration of a dedicated physical random access channel (PRACH) resource or a dedicated preamble resource (dedicated PRACH/preamble resource); and while in a radio resource control (RRC) INACTIVE state, without entering an RRC CONNECTED state, using a contention-free random access (CFRA) process to transmit uplink data to a base station using the dedicated PRACH/preamble resource.

Example 17 includes the subject matter of example 16, including or omitting optional elements, further including receiving the dedicated PRACH/preamble resource from the network during an RRC Suspend process.

Example 18 includes the subject matter of example 16, including or omitting optional elements, further including identifying a preamble in the dedicated PRACH/preamble resource; transmitting the preamble to the base station in a Msg1 of a random access control channel (RACH) process; receiving an indication of physical uplink shared channel (PUSCH) resources in a Msg2 of a random access control channel (RACH) process; and transmitting the uplink data to the base station using the PUSCH resources.

19. The method of claim 16, further comprising:
transmitting a dedicated preamble indicated in the dedicated PRACH/preamble resource and the uplink data in a MsgA PUSCH resource associated with a RACH process.

20. The method of claim 16, further comprising:
transmitting, to the base station a dedicated preamble indicated in the dedicated PRACH/preamble resource;
receiving a dedicated physical downlink control channel (PDCCH) scheduling from the base station; and
transmitting the uplink data on a tracking area code (TAC) media access control (MAC) control element (CE) indicated by the received PDCCH scheduling.

Example 21 includes the subject matter of example 16, including or omitting optional elements, further including receiving a broadcast message from the base station that indicates whether a cell on which the UE is camping supports direct uplink transmission from INACTIVE UE; and refraining from transmitting the uplink data to the base station when the broadcast message does not indicate that the cell supports direct uplink transmission from INACTIVE UE.

Example 22 includes the subject matter of example 16, including or omitting optional elements, further including receiving a broadcast message from the base station that identifies the dedicated PRACH/preamble resource for a cell on which the UE is camping; and transmitting the uplink data to the base station using the dedicated PRACH/preamble resource identified in the broadcast message.

Example 23 includes the subject matter of example 16, including or omitting optional elements, further including receiving, from the base station, a validity indicator that indicates whether the dedicated PRACH/preamble resource is valid or invalid; and refraining from transmitting the uplink data to the base station when the validity indicator indicates that the dedicated PRACH/preamble resource is invalid.

Example 24 includes the subject matter of example 16, including or omitting optional elements, further including determining a contention free RACH (CFRA) area that includes a set of cells; and refraining from transmitting the uplink data to the base station using the CFRA process when the base station is not in the set of cells.

Example 25 includes the subject matter of example 16, including or omitting optional elements, further including receiving the dedicated PRACH/preamble resource from the network during an RRC Suspend process; starting a timer at completion of the RRC Suspend process; suspending the timer while transmitting the uplink data using the CFRA process; restarting the timer after transmitting the uplink data using the CFRA process; and refraining from transmitting the uplink data using the CFRA process after the timer expires.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor configured to, when executing instructions stored in a memory, perform operations comprising: receiving configuration of a dedicated physical random access channel (PRACH) resource or a dedicated preamble resource (dedicated PRACH/preamble resource) during a radio resource control (RRC) Suspend process; starting a timer at completion of the RRC Suspend process; causing transmission of uplink data using the dedicated PRACH/preamble resource using a contention free random access (CFRA) process while in a radio resource control (RRC) INACTIVE state, and without entering an RRC CONNECTED state; suspending the timer during the transmission of the uplink data using the CFRA process; restarting the timer after the transmission of the uplink data using the CFRA process; and refraining from causing transmission of the uplink data using the CFRA process after the timer expires.

2. The baseband processor of claim 1, wherein the operations comprise: identifying a preamble in the dedicated PRACH/preamble resource; transmitting the preamble in a Msg1 of a random access control channel (RACH) process; receiving an indication of physical uplink shared channel (PUSCH) resources in a Msg2 of random access control channel (RACH) process; and transmitting the uplink data using the PUSCH resources.

3. The baseband processor of claim 1, wherein the operations comprise:
transmitting a dedicated preamble indicated in the dedicated PRACH/preamble resource and the uplink data in a MsgA PUSCH resource associated with a RACH process.

4. The baseband processor of claim 1, wherein the operations comprise: transmitting a dedicated preamble indicated in the dedicated PRACH/preamble resource; receiving a dedicated physical downlink control channel (PDCCH); and transmitting the uplink data on a tracking area code (TAC) media access control (MAC) control element (CE) indicated by the received PDCCH.

5. The baseband processor of claim 1, wherein the operations comprise: receiving a broadcast message that indicates whether a cell on which a UE is camping supports direct uplink transmission from INACTIVE UE; and refraining from transmitting the uplink data when the broadcast message does not indicate that the cell supports direct uplink transmission from INACTIVE UE.

6. The baseband processor of claim 1, wherein the operations comprise: receiving a broadcast message that indicates whether a cell on which a UE is camping supports direct uplink transmission from INACTIVE UE and identifies a supported PRACH/preamble resource; and refraining from causing transmission of the uplink data using the CFRA process when the supported PRACH/preamble resource is different from the dedicated PRACH/preamble resource.

7. The baseband processor of claim 1, wherein the operations comprise: receiving a broadcast message that indicates whether a cell on which a UE is camping supports direct uplink transmission from INACTIVE UE and identifies a supported PRACH/preamble resource for direct uplink transmission from INACTIVE UE; and refraining from causing transmission of the uplink data using the CFRA process when the supported PRACH/preamble resource is different from the dedicated PRACH/preamble resource.

8. The baseband processor of claim 1, wherein the operations comprise: receiving a broadcast message that identifies the dedicated PRACH/preamble resource for a cell on which a UE is camping; and causing transmission of the uplink data using the dedicated PRACH/preamble resource identified in the broadcast message.

9. The baseband processor of claim 1, wherein the operations comprise: receiving a validity indicator that indicates whether the dedicated PRACH/preamble resource is valid or invalid; and refraining from causing transmission of the uplink data when the validity indicator indicates that the dedicated PRACH/preamble resource is invalid.

10. A user equipment (UE) comprising a memory and a baseband processor configured to, when executing instructions stored in the memory, perform operations comprising: receive configuration of a dedicated physical random access channel (PRACH) resource or a dedicated preamble resource (dedicated PRACH/preamble resource) during a radio resource control (RRC) Suspend process; start a timer at completion of the RRC Suspend process; transmit uplink data using the dedicated PRACH/preamble resource using a contention free random access (CFRA) process while in a radio resource control (RRC) INACTIVE state, and without entering an RRC CONNECTED state; suspend the timer while transmitting the uplink data using the CFRA process; restart the timer after transmitting the uplink data using the CFRA process; and refrain from causing transmission of the uplink data using the CFRA process after the timer expires.

11. The UE of claim 10, wherein the baseband processor is configured to cause the UE to: identify a preamble in the dedicated PRACH/preamble resource; transmit the preamble in a Msg1 of a random access control channel (RACH) process; receive an indication of physical uplink shared channel (PUSCH) resources in a Msg2 of random access control channel (RACH) process; and transmit the uplink data using the PUSCH resources.

12. The UE of claim 10, wherein the baseband processor is configured to cause the UE to: transmit a dedicated preamble indicated in the dedicated PRACH/preamble resource and the uplink data in a MsgA PUSCH resource associated with a RACH process.

13. The UE of claim 10, wherein the baseband processor is configured to cause the UE to: transmit a dedicated preamble indicated in the dedicated PRACH/preamble resource; receive a dedicated physical downlink control channel (PDCCH) scheduling; and transmit the uplink data on a tracking area code (TAC) media access control (MAC) control element (CE) indicated by the received PDCCH scheduling.

14. The UE of claim 10, wherein the baseband processor is configured to cause the UE to: receive a validity indicator that indicates whether the dedicated PRACH/preamble resource is valid or invalid; and refrain from transmitting the uplink data when the validity indicator indicates that the dedicated PRACH/preamble resource is invalid.

15. A method, comprising: receiving configuration of a dedicated physical random access channel (PRACH) resource or a dedicated preamble resource (dedicated PRACH/preamble resource) during a radio resource control (RRC) Suspend process; starting a timer at completion of the RRC Suspend process; transmitting uplink data using the dedicated PRACH/preamble resource using a contention free random access (CFRA) process while in a radio resource control (RRC) INACTIVE state, and without entering an RRC CONNECTED state; suspending the timer while transmitting the uplink data using the CFRA process; restarting the timer after transmitting the uplink data using the CFRA process; and refraining from transmitting the uplink data using the CFRA process after the timer expires.

16. The method of claim 15, comprising: transmitting a dedicated preamble indicated in the dedicated PRACH/preamble resource; receiving a dedicated physical downlink control channel (PDCCH); and transmitting the uplink data on a tracking area code (TAC) media access control (MAC) control element (CE) indicated.

17. The method of claim 15, comprising: receiving a broadcast message that indicates whether a cell on which a UE is camping supports direct uplink transmission from INACTIVE UE; and refraining from transmitting the uplink data when the broadcast message does not indicate that the cell supports direct uplink transmission from INACTIVE UE.

18. The method of claim 15, comprising: receiving a broadcast message that indicates whether a cell on which a UE is camping supports direct uplink transmission from INACTIVE UE and identifies a supported PRACH/preamble resource; and refraining from transmitting the uplink data using the CFRA process when the supported PRACH/preamble resource is different from the dedicated PRACH/preamble resource.

19. The method of claim 15, comprising: receiving a broadcast message that indicates whether a cell on which a UE is camping supports direct uplink transmission from INACTIVE UE and identifies a supported PRACH/preamble resource for direct uplink transmission from INACTIVE UE; and refraining from transmitting the uplink data using the CFRA process when the supported PRACH/preamble resource is different from the dedicated PRACH/preamble resource.

20. The method of claim 15, comprising: receiving a broadcast message that identifies the dedicated PRACH/preamble resource for a cell on which a UE is camping; and transmitting the uplink data using the dedicated PRACH/preamble resource identified in the broadcast message.

* * * * *